(No Model.)
W. N. WHITELEY.
BELT GEARING.
No. 320,734. Patented June 23, 1885.
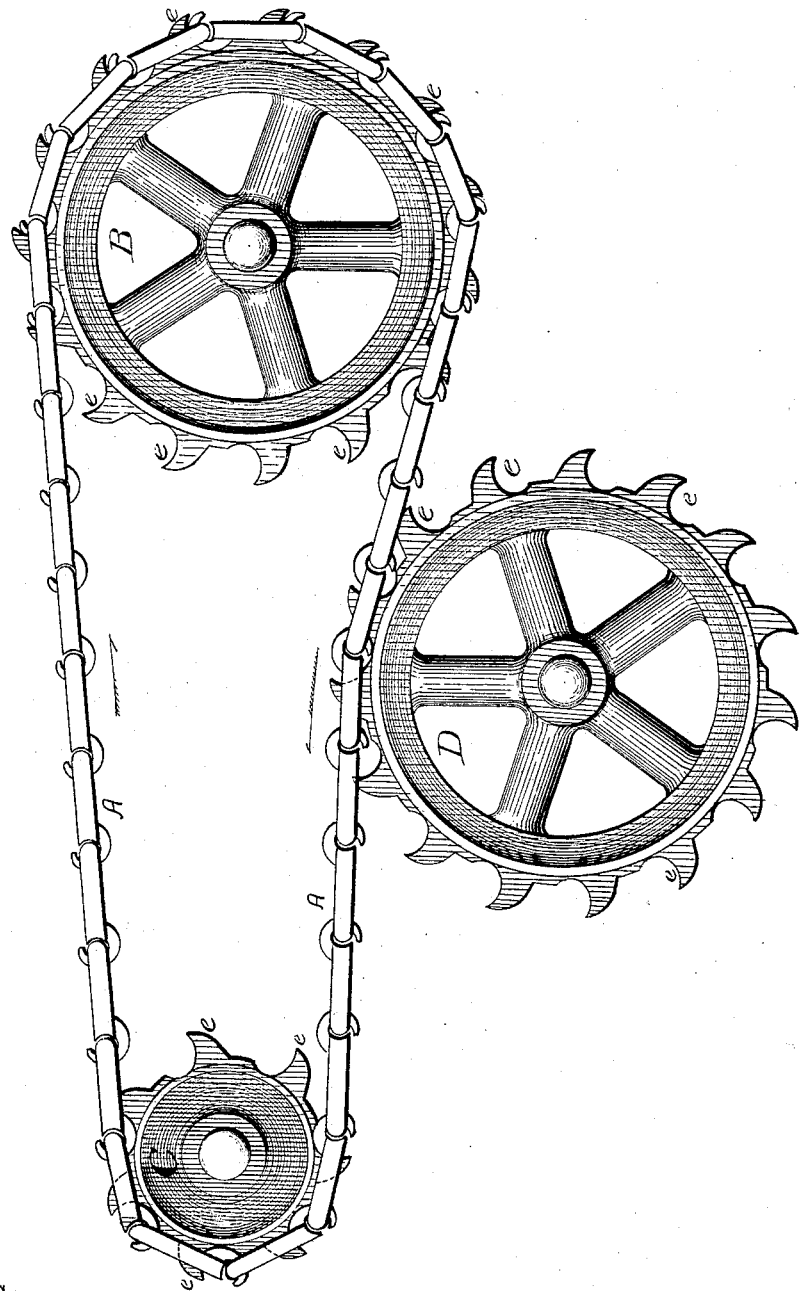
WITNESSES:
INVENTOR
BY
ATTORNEY

UNITED STATES PATENT OFFICE.

WILLIAM N. WHITELEY, OF SPRINGFIELD, OHIO.

BELT-GEARING.

SPECIFICATION forming part of Letters Patent No. 320,734, dated June 23, 1885.

Application filed May 16, 1885. (No model.)

*To all whom it may concern:*

Be it known that I, WILLIAM N. WHITELEY, of Springfield, in Clark county, in the State of Ohio, have invented a new and useful Improvement in Belt-Gearing; and I do hereby declare that the following is a full and accurate description of the same, reference being had to the accompanying drawing, wherein the figure is a perspective view of my invention.

Chain-belts running upon sprocket-wheels for the purpose of transmitting motion are now employed for a great many purposes. They are extensively employed in harvesting machinery, and owing to the violent service to which such machines are subjected in passing over rough and uneven ground it is impossible to maintain a uniform tension or draft on the chain-belt, and both faces of the sprocket being convex the consequence is that it is very liable and frequently does jump over a tooth of the sprocket. To obviate this liability and troublesome result, I make the sprockets of my wheel curved forward, so as to be concave on the draft-side, and therefore when engagement between the tooth and chain-link has once been effected the link cannot thereafter accidentally escape.

In the drawing a transmitting-chain, A, is shown passing over and taking motion from a driving-sprocket, B. It also passes over and transmits motion to a sprocket, C, and other sprockets, D, may be interposed to take motion from the same chain, if desired.

Each wheel is provided with the curved sprockets $e$, concave on their draft-faces. With all other sprockets driven by chain it is necessary to positively depress the chain upon the sprocket to force it to the base of the sprocket and incidently to hold it there to prevent its jumping, as described. The service of an idler for this purpose absorbs power and increases frictional wear and tear. By my invention this extra service may be dispensed with, because when the tooth has once entered the link with draft-strain the concave draft-face will securely hold it in engagement.

Having described my invention, I claim as new—

The combination of an open linked chain-belt with wheels B and C, provided with sprockets $e$, concave on their draft-faces, substantially as set forth.

WILLIAM N. WHITELEY.

In presence of—
SOL J. HOUCK,
F. B. FURNISS.